Dec. 3, 1968      E. V. BISHOP      3,414,148
POWER LOADING SEMI-TRAILER
Filed July 11, 1966      4 Sheets-Sheet 1
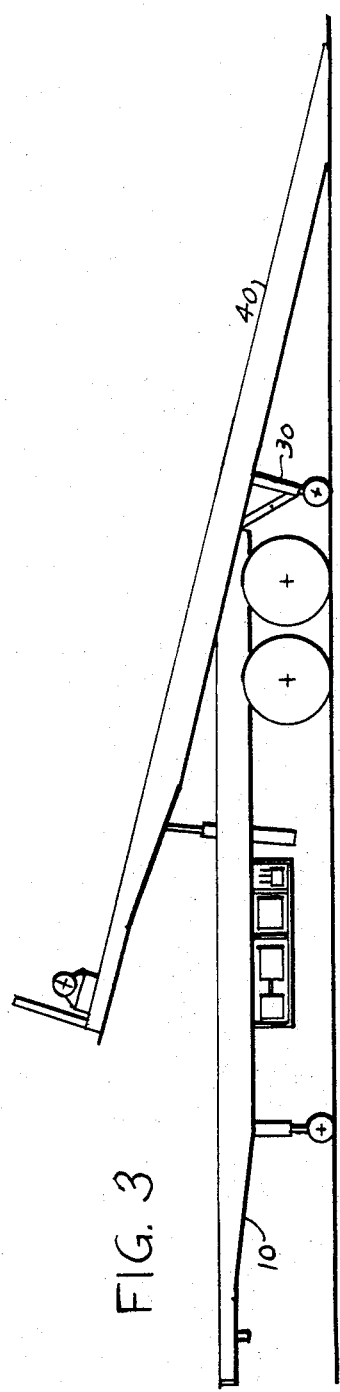
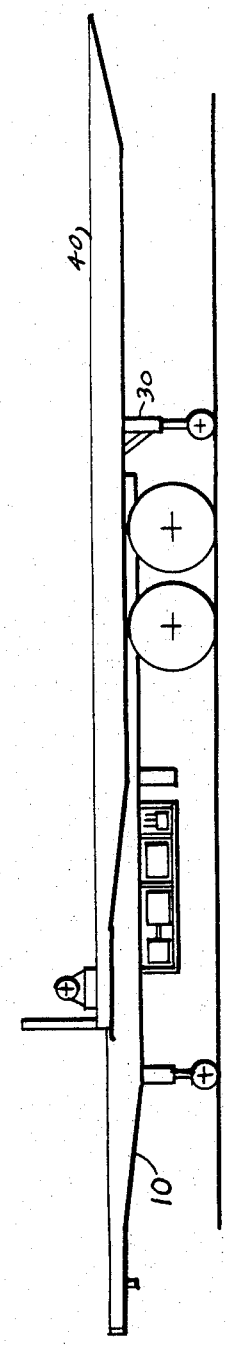
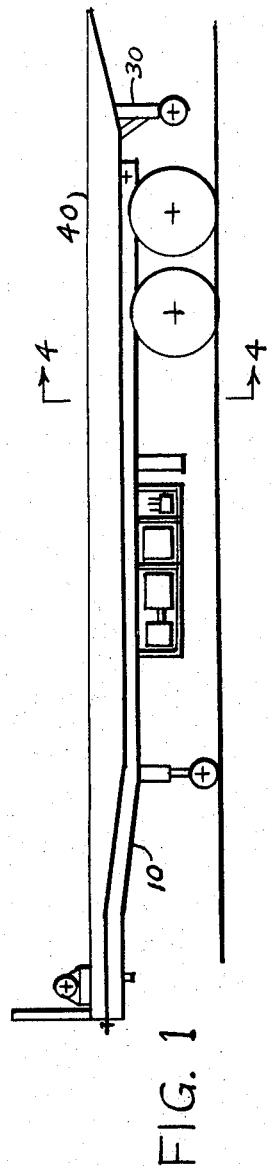
INVENTOR.
EDWIN V. BISHOP Dec. 3, 1968 E. V. BISHOP 3,414,148
POWER LOADING SEMI-TRAILER
Filed July 11, 1966 4 Sheets-Sheet 2
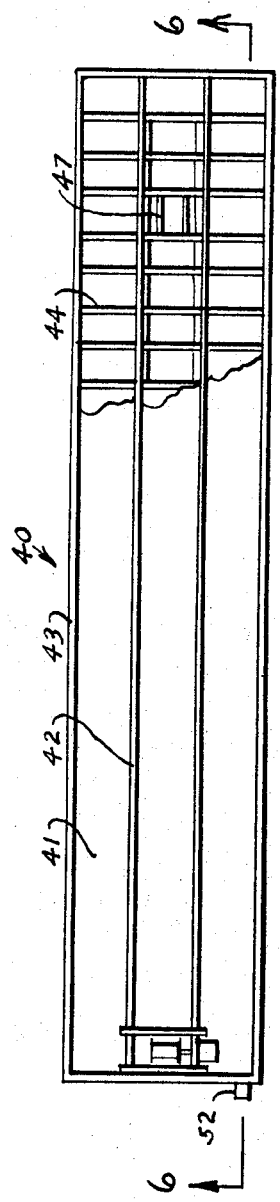
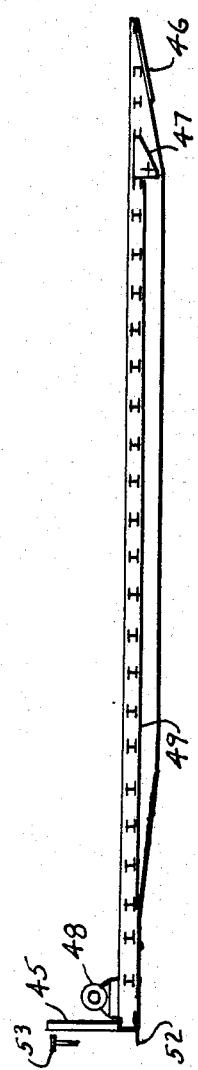
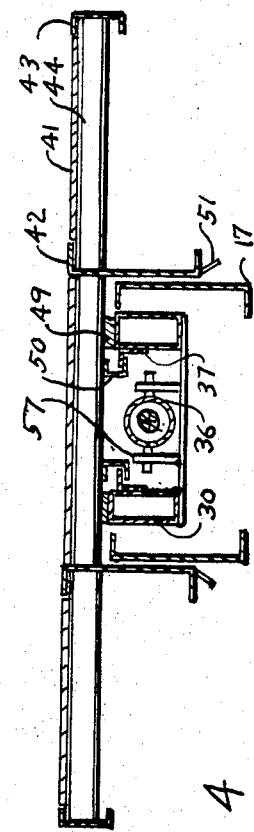
INVENTOR.
EDWIN V. BISHOP

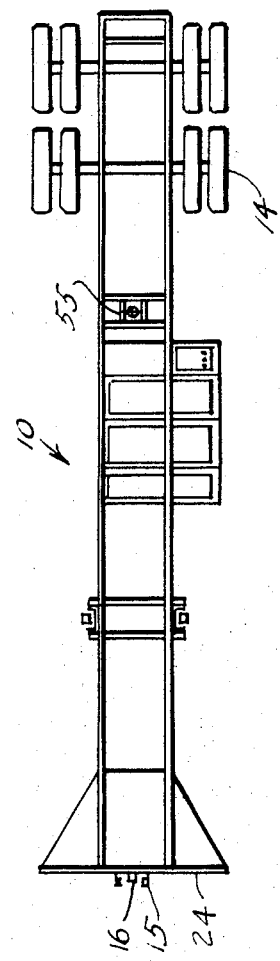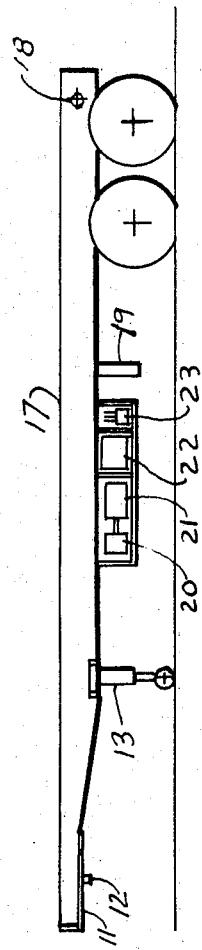

Dec. 3, 1968  E. V. BISHOP  3,414,148
POWER LOADING SEMI-TRAILER
Filed July 11, 1966  4 Sheets-Sheet 4

INVENTOR.
EDWIN V. BISHOP

United States Patent Office 3,414,148
Patented Dec. 3, 1968

3,414,148
POWER LOADING SEMI-TRAILER
Edwin V. Bishop, P.O. Box 265, Sparks, Md. 21152
Filed July 11, 1966, Ser. No. 569,000
7 Claims. (Cl. 214—505)

ABSTRACT OF THE DISCLOSURE

This invention relates to semi-trailers of the type in highway service for transporting cargo. The semi-trailer of this invention differs from any other art known to me in that it comprises in combination a wheeled semi-trailer chassis, an elongated tilt frame pivotally mounted to said chassis and a load receiving bed slidably mounted to said tilt frame, there being power means cooperating between said wheeled semi-trailer chassis and said tilt frame to produce tilting motion and power means cooperating between said tilt frame and said load receiving sliding bed to produce sliding motion. The tilt frame is provided at the rear with a wheeled landing gear to provide support against longitudinal tipping when the sliding bed is extended rearwardly and at the same time permitting convenient forward or rearward motion of the vehicle. The rear of the sliding bed is equipped with a tapered shoe which may be slid along the ground or pavement and conveniently thrust under a load or withdrawn from under a load.

---

It is an object of this invnetion to provide a semi-trailer having special loading and unloading capabilities, which can be readily placed in the same service as conventional semi-trailers and can be used in conjunction with the same tractors that handle conventional semi-trailers with equal facility and without any alteration to semi-trailer or tractor.

A further object of this invention is to provide a semi-trailer which has a cargo receiving bed which may be provided with a power operated winch at its forward end and which may be slid rearward from its normal position and also be tilted upward at its forward end creating a convenient ramp for loading or unloading at ground height or loading dock height or from an intermediate position.

A further object of this invention is to provide a semi-trailer which may be loaded and unloaded safely and expeditiously with ordinary cargo, within the size and weight limitations of the semi-trailer, from ground level, by one person unassisted and without additional equipment or facilities.

A further object of this invention is to provide a semi-trailer having the deck a minimum height above the ground consistent with strength requirements, which is of good and proper appearance, which is economical to construct and maintain and which can be produced in quantity and sold at reasonable cost.

Still other objects and benefits and advantages of this invention will become evident from a study of the following detailed description taken in conjunction with the accompanying drawings in which:

FIGURE 1 is a side view of the semi-trailer of this invention in configuration for normal over the road transport.

FIGURE 2 is a side view of the semi-trailer of this invention with the sliding bed extended rearward and an adjustable rear landing gear adjusted downward having its ground contactors contacting ground.

FIGURE 3 is a side view of the semi-trailer of this invention with the sliding bed extended rearward and tilted, a rear landing gear with its ground contacting member in contact with the ground and the extreme rear of the sliding bed in contact with the ground thus creating a convenient loading ramp.

FIGURE 4 is a cross section at 4–4 of Figure 1.

FIGURE 5 is a plan view of the sliding bed of the semi-trailer of this invention.

FIGURE 6 is a longitudinal section at 6–6 of Figure 5.

FIGURE 7 is a plan view of the semi-trailer chassis of the semi-trailer of this invnetion.

FIGURE 8 is a side view of the semi-trailer chassis of the semi-trailer of this invention.

Like numerals designate corresponding parts in all of the figures of the drawings.

Figure 9:
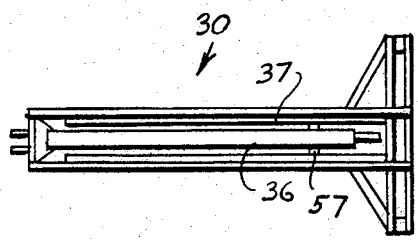
FIGURE 9 is a plan view if the tilt frame of the semi-trailer of this invention.
Figure 10:
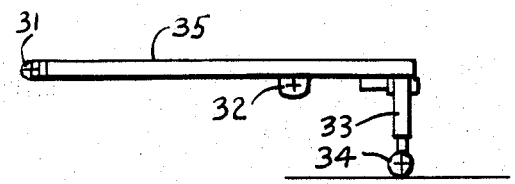
FIGURE 10 is a side view of the tilt frame of the semi-trailer of this invention.
Figure 11:
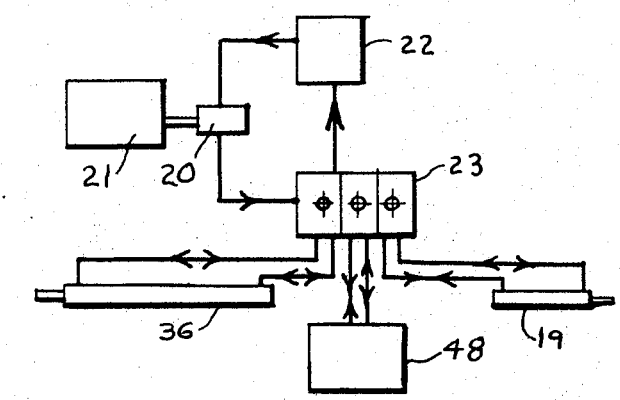
FIGURE 11 is a schematic diagram of the hydraulic system of the semi-trailer of this invention.

In the drawings 10 designates the semi-trailer chassis of the semi-trailer of this invention, comprising in combination conventional ground wheels and shock mitigating suspension 14, a structural frame 17 with front sill 24, conventional landing gear 13, conventional fifth wheel plate 11, conventional king pin 12, conventional semi-trailer braking system 15, conventional electrical connection for semi-trailer running lights 16, and including an hydraulic pump 20 together with means for powering it 21, an hydraulic reservoir 22, an hydraulic directional control valve 23, a vertically disposed trunnion mounted hydraulic cylinder 19, hydraulic cylinder mounts 55 and rear pivots 18.

In the drawings 30 designates the tilt frame of the semi-trailer of this invention comprising in combination a structural assembly 35, hydraulic cylinder mounting brackets 31, pivot brackets 32, rear landing gear 33, anti-friction ground contactors 34, horizontally disposed trunnion mounted hydraulic cylinder 36, hydraulic cylinder mounts 57 and rebound restrainer slides 37.

In the drawings 40 designates the sliding bed of the semi-trailer of this invention comprising in combination a floor 41, main beams 42, side rails 43, cross sills 44, head frame 45, ground contacting shoe 46, hydraulic cylinder mounting 47, winch and hydraulic motor 48, elongated bearing strips 49, rebound restrainer 50, guide bar 51, locking bar 52, and removable pin 53.

The tilt frame 30 is attached to the semi-trailer chassis 10 by means of a pin passing through each of the pivots 18 and its cooperating pivot bracket 32 and by a pin passing through the piston rod of hydraulic cylinder 19 and the cooperating mounting brackets 31. The pins are not shown as they are simple pieces of steel bar stock secured in place with ordinary flat washers and cotter pins.

The sliding bed 40 is attached to the tilt frame 30 by means of a pin passing through the piston rod of the horizontally disposed hydraulic cylinder 36 and the cooperating hydraulic cylinder mounting bracket 47 and the interlocking of the rebound reainer slides 37 with the rebound restrainer 50. The pin is not shown as it is a simple piece of steel bar stock secured in place with ordinary flat washers and cotter pins.

The guide bars 51 are positioned on the main beams 42 of the sliding bed 40 so as to guide said main beams 42 into proper relationship to the structural frames 17 of the chassis overcoming minor unavoidable and erratic misalignments of the adjacent parts as the said sliding bed 40 is lowered from a tilted position to the untilted position, where overlapping of the beams occurs.

The locking bar 52 attached to the forward cross sill 44 of the sliding bed 40 is so located as to pass through a slot in front sill 24 of semi-trailer chassis 10 when the said sliding bed 40 is in horizontal position and all the way forward. A removable pin 53 is inserted in a hole in locking bar 52 to secure it against being withdrawn rearward without first removing said removable pin 53.

The head frame 45 is secured to the forward end of sliding platform 40 and serves to restrain cargo from forward motion beyond the forward limits of the sliding bed 40 in case of sudden stop.

The winch 48 is secured to the floor 41, cross sills 44 and main beams 42 against the pull of winch cable of winch 48.

The rear landing gear 33 is mounted at the rear of tilt frame 30 the length of overhang of said tilt frame 30 beyond pivot 18 in conjunction with the mounting height of said landing gear 33 being such as to cause the ground contacting members 34 of landing gear 33 to contact the ground when the tilt frame 30 is fully tilted but to be clear of the ground when the tilt frame 30 is not tilted, the semi-trailer being on level ground.

The usefulness of rear landing gear 33 is brought about by the ability of sliding bed 40 to move so far to the rear as to cause excessive load on the ground wheels and suspension 14 of semi-trailer chassis 10 and produce instability resulting in uplift at the front end. The length of overhang of the tilt frame 30 and resultant positioning of rear landing gear 33 is such as to relieve the overloading of the said ground wheels and suspension and to produce stability. Auxiliary blocking under the structural assembly 35 of tilt frame 30 can be used to prevent overloading of ground wheels and suspension 14 of semi-trailer chassis 10 and stability can be achieved by leaving the tractor attached to the king pin 12 to overcome the uplift, but both of these operations may result in inconvenience and lost time.

Tractors used in conjunction with semi-trailers may be equipped with means of supplying hydraulic fluid under pressure to operate the power means of producing the sliding and tilting motions of the sliding bed 40 and the tilt frame 30 and also to operate the winch and hydraulic motor 48. When the semi-trailer of this invention may be limited to use only in conjunction with a tractor so equipped the hydraulic pump 20 and power means 21 for powering it are not required for operation.

Tractors used in conjunction with semi-trailers are sometimes equipped with power winches. When the semi-trailer of this invention may be limited to use only with a tractor so equipped with winch and hydraulic motor 48 are not required for operation.

It is sometimes necessary to load or unload at a height not requiring full tilting of the tilt frame 30. In this case the ground contactors 34 of the rear landing gear 33 will not contact the ground. To overcome this difficulty the rear landing gear 33 may be made adjustable in the manner of the conventional semi-trailer landing gear 13.

It is to be noted that when the sliding bed 40 is extended and the rear ground contacting sheet 46 is in contact with the ground there is support at the rear but as soon as the motion starts to return the sliding bed 40 to its normal position the rear support is lost with the sliding bed 40 still very close to full rearward extension.

While the semi-trailer can function without the guide bars 51, they are desirable to assist in correcting minor lateral misalignment of the main rails of the sliding bed in relation to the side frames of the chassis, which they overlap in close proximity in untilted position.

While the semi-trailer of this invention can operate in reasonable safety without them the locking bar 52 and removable pin 53 are included as desirable safety devices due to the fact that a heavy load on the rear of the sliding bed 40 may cause a sustained tendency to tilt against the restraint of hydraulic cylinder 19 and acceleration or parking with the forward end uphill from the rear will cause a sustained tendency for the sliding bed 40 to slide rearward against the restraint of hydraulic cylinder 36 and where there is sustained load against an hydraulic cylinder creeping is apt to take place by virtue of seepage of hydraulic fluid past the packings.

The operation of this semi-trailer will now be readily understood. In order to pick up an object from the ground the semi-trailer is backed to within a reasonable distance of the object. Hydraulic fluid under pressure is next supplied to the hydraulic directional control valve 23 by starting the power means of the hydraulic pump 20 or by connecting to an external source. The removable pin 53 is next removed and the sliding bed slid rearward just enough to disengage locking bar 52 from front sill 24 by means of operating the proper lever of directional control valve 23 permitting hydraulic fluid under pressure to flow to the front end of hydraulic cylinder 36 and hydraulic fluid to pass from the rear of hydraulic cylinder 36 to an hydraulic fluid reservoir. In like manner hydraulic fluid is fed into the lower end of hydraulic cylinder 19 with return fluid from the upper end causing tilting of the tilt frame 30 and sliding bed 40. Sliding of sliding bed 40 is then continued until extension is complete and ground contacting shoe 46 in contact with the ground.

Sliding bed 40 having been put into ramp position for receiving a load, it is necessary to make sure that the rear landing gear 33 is in proper position with its ground contactors in contact with the ground. If necessary adjust rear landing gear 33 or provide auxiliary supports.

The load may next be drawn onto the sliding bed 40 by use of power winch 48. If the load is such that it may not be readily slid the rear ground contacting shoe 46 may be forced under the load under the action of the cable pull from power winch 48 since the whole semi-trailer may move rearward, the rear ground contacting shoe 46 sliding, the anti-friction ground contactor 34 sliding or rolling and the ground wheels of conventional landing gear 13 rolling. If attached, the tractor may also roll rearward.

When the load is in position on sliding bed 40, and said sliding bed is slid almost all of the way forward under the action of hydraulic cylinder 36, the hydraulic cylinder 19 may be actuated to return the tilt frame 30 and sliding bed 40 to the horizontal position. The sliding bed 40 may then be slid the balance of the way forward causing locking bar 52 to pass through the slot in front sill 24. Removable pin 53 may then be placed in position providing a positive lock.

For unloading, the sliding bed with its load is placed in ramp position as for loading and the load may be slid down the sliding bed 40 and the semi-trailer pulled out from the load or the cable pull may be utilized by passing the cable around an anchor point reversing the direction of pull to pull the load off of the bed.

While this invention has been described with particular reference to the construction shown in the drawings and while various changes may be made in the detailed construction it shall be understood that such changes shall be within the spirit and scope of the present invention as defined by the appended claims.

Having thus fully described my invention what I claim is:

1. A structure of the character described comprising in combination a wheeled semi-trailer chassis, an elongated tilt frame, and a load receiving sliding bed, with one or more hydraulic cylinders cooperating between said semi-trailer chassis and said elongated tilt frame for producing tilting action, a hydraulic cylinder cooperating between said sliding bed and said elongated tilt frame for producing sliding action, a hydraulic directional control valve together with interconnecting hydraulic piping and fittings for selectively directing hydraulic fluid to and from the hydraulic cylinders, said tilt frame having strong longitudinal side and cross members with rebound retainer slides attached to the strong longitudinal side members, and the sliding bed comprising a floor, a plurality of cross sills attached to two spaced longitudinal side rails having top flanges substantially flush with the top of the floor, and two main beams intermediate said she rails with top flanges substantially flush with the top of the floor and having perforated webs through which the cross sills pass and to which they are attached, rebound retainers cooperating with said rebound retainer slides to prevent separation of said sliding bed from said tilt frame, and elongated bearing strips attached to the lower flanges of said cross sills and bearing upon said tilt frame side members.

2. A structure as recited in claim 1 in combination with a means of providing hydraulic fluid under pressure including in combination a source of power, an hydraulic pump and an hydraulic fluid reservoir.

3. A structure as recited in claim 1 in combination with guide bars attached to the sliding bed and a positive locking device cooperating between the wheeled semi-trailer chassis and the sliding bed.

4. A structure as recited in claim 1 in combination with a power winch mounted at the forward end of the sliding bed.

5. A structure as recited in claim 1 in combination with a rear landing gear attached to the rear of the elongated tilt frame.

6. A vehicle of the character described, consisting of a semi-trailer chassis, a tilt frame pivotally mounted to said semi-trailer chassis, and a sliding bed slidably mounted to said tilt frame, power means cooperating between said semi-trailer chassis and said tilt frame to produce tilting action, power means cooperating between said tilt frame and said sliding bed to produce sliding action, said tilt frame having strong longitudinally extending side members with rebound retainer slides attached and the sliding bed comprising a floor, a plurality of transverse sills upon which the floor rests, longitudinally extending side rails with top flanges substantially flush with the top of the floor attached to the ends of the transverse sills, a pair of main beams with top flanges substantially flush with the top of the floor spaced intermediate the side rails and having perforated webs through which the sills pass and to which they are attached, said main beams having attached rebound retainers cooperating with the said rebound retainer slides to prevent separation of the said sliding bed from the said tilt frame, the said main beams spaced to overlap the semi-trailer chassis on the outboard sides with the transverse sills bearing upon the semi-trailer chassis frame in untilted position, and elongated bearing strips attached to the bottoms of the transverse sills positioned to bear upon the tops of the tilt frame side rails.

7. A vehicle of the character described in claim 1 having a landing gear with an anti-friction ground contactor, mounted to the rear of the tilt frame and a ground contacting shoe secured to the rear of the sliding bed to permit forward and rearward movement of the vehicle while loading and unloading.

References Cited

UNITED STATES PATENTS

| | | | |
|---|---|---|---|
| 2,156,438 | 5/1939 | Suverkrup | 214—505 |
| 2,621,814 | 12/1952 | Lisota | 214—505 |
| 2,741,383 | 4/1956 | Leckert | 214—505 |
| 2,745,566 | 5/1956 | Bouffard | 214—505 |
| 3,043,458 | 7/1962 | Klosek et al. | 214—505 |
| 3,159,294 | 12/1964 | Forsythe | 214—505 |

ALBERT J. MAKAY, *Primary Examiner.*